March 17, 1936. W. C. KNOERNSCHILD ET AL 2,034,194
METHOD AND APPARATUS FOR PRODUCING LAMBSKIN POWDER PUFFS
Filed Jan. 18, 1935

WITNESSES
L. E. Kilian
C. L. Naal

INVENTORS
William C. Knoernschild
Norbert W. Knoernschild
By R. A. Caldwell
ATTORNEY Patented Mar. 17, 1936

2,034,194

UNITED STATES PATENT OFFICE 2,034,194

METHOD AND APPARATUS FOR PRODUCING LAMBSKIN POWDER PUFFS

William C. Knoernschild and Norbert W. Knoernschild, Milwaukee, Wis., assignors to Milwaukee Tanning Company, Milwaukee, Wis., a corporation of Wisconsin Application January 18, 1935, Serial No. 2,448

6 Claims. (Cl. 164—58)

The invention relates to a method for producing lambskin powder-puffs and the like, and to apparatus for producing the same.

An object of the invention is to provide an improved method for expeditiously producing lambskin powder-puffs and the like, whereby to minimize cutting of the wool or hair around the edges of the articles and to avoid irregular or uneven edges.

Another object of the invention is to provide apparatus for facilitating the cutting of the lambskin.

Referring to the accompanying drawing.

Figure 1:
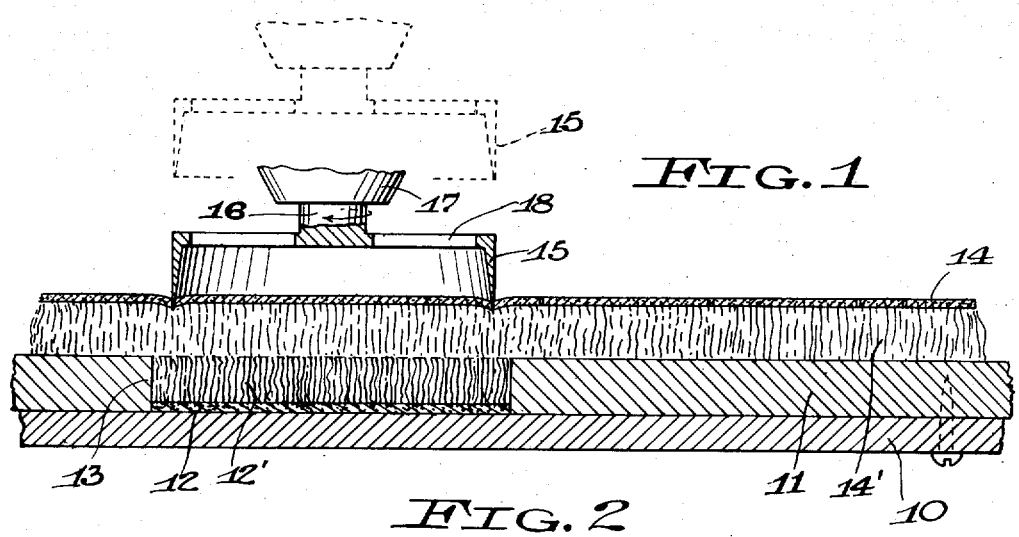
Fig. 1 is a sectional elevation of an apparatus constructed in accordance with the invention and suitable for carrying out the method of the invention, a lambskin being shown in cutting position.
Figure 2:
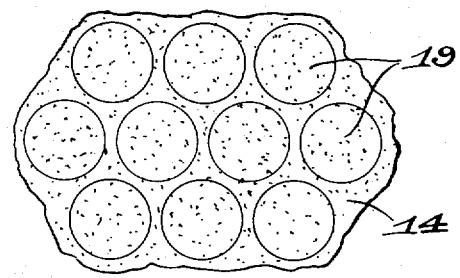
Fig. 2 is a plan view of a lambskin which has been cut by the method.
Figure 3:
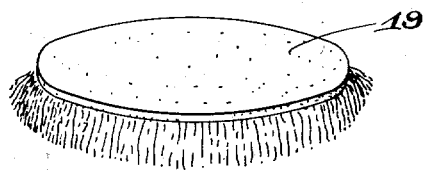
Fig. 3 is a perspective view of a lambskin powder-puff produced by the method.

In the drawing, 10 designates a flat-topped member on which is suitably secured a flat panel 11 to form a table. The panel 11 is preferably provided with a resilient pad 12 inserted in a circular opening 13 formed in the panel, the upper surface of the pad being approximately flush with or slightly above the top plane of the panel. The pad is preferably formed of a circular section of lambskin with the wool 12' up.

The panel 11 forms a support for a tanned lambskin 14 which is rested thereon with its wool 14' in contact with the panel and with the resilient pad 12.

A cutter 15, preferably a rotary cutter with an annular knife-like cutting edge, is supported above the table in any suitable manner and is movable downwardly into cutting engagement with the flesh side of the lambskin. The cutter is arranged centrally above the resilient pad 12, the pad being larger in diameter than the cutter. The cutter is here shown to be in the form of an inverted cup with cylindrical walls and having a central shank 16 which is clamped in a suitably driven rotary chuck 17. The web of the rotary cutter is provided with one or more apertures 18 through which the operator may view the lambskin and the progress of the cutting. In some instances, the flat-topped table member 10 and chuck 17 may be parts of an ordinary drill-press. Instead of moving the cutter down to the work, it is obvious that the work may be moved up to the cutter.

The lambskin 14, with its wool 14' sheared to a uniform length, is placed on the panel or table 11 with its flesh side up, and is shifted by the operator along the table to bring a suitable portion of the skin beneath the elevated rotary cutter, which latter is then depressed into cutting engagement with the skin, the operator holding the lambskin in position. The cutter is moved downwardly just far enough to cut through the skin proper without cutting the wool. During the cutting operation the skin will yield downwardly to some extent as indicated in Fig. 1, because of the resilience of the wool. The pad 12 provides additional cushioning effect and also exerts a frictional effect on the lambskin. The cutter is then raised and after the lambskin is shifted along the table to another position, the cutting operation is repeated. Successive cuts are made in the same manner, and after all the cutting operations are completed, the several powder-puffs 19 thus formed are separated from the lambskin, the powder-puffs having adhered to the lambskin by the meshing of the wool fibres.

The skin portion of each powder-puff has a smooth regular edge, and the full amount of wool is left around the edge of the powder-puff so that after the wooly edge spreads out it will have a regular appearance.

The method of the invention may also be used for producing other articles of hair-bearing material, such as mops, polishers, and buttons, where it is desirable to avoid cutting the hair at the edges of the articles and to obtain regular edges.

What we claim as new and desire to secure by Letters Patent is:

1. Apparatus for producing a pad from a hair-bearing skin, comprising a resilient support on which the skin is placed flesh side up, and a rotary cutter engageable with the skin to cut through the skin proper but not into the hair, said resilient support being yieldable downwardly under the pressure of the cutter against the skin.

2. A cutting table for hair-bearing skins, comprising a support on which a skin is placed with its flesh side up, said support having a recess, and a resilient member in said recess yieldable downwardly to cushion the portion of the skin to be cut.

3. Apparatus for producing a circular pad from a hair-bearing skin, comprising a support on which the skin is placed flesh side up, and a cutter above the support rotatable on an axis perpendicular to the skin and having a smooth knife-like skin-engaging cutting edge movable in a circular path concentric with said axis to cut out a smooth-edged circular section of the skin.

4. Apparatus for producing a circular pad from a hair-bearing skin, comprising a support on which the skin is placed flesh side up, and a cutter above said support rotatable on an axis perpendicular to the skin and having an annular cutting edge concentric with said axis and engageable in an axial direction with the skin.

5. Apparatus for producing a circular pad from a hair-bearing skin, comprising a support on which the skin is placed flesh side up, and a cutter above said support rotatable on an axis perpendicular to the skin and having an annular cutting edge concentric with said axis and engageable in an axial direction with the skin, said cutter being apertured for viewing the skin therethrough.

6. The method for producing a lambskin powderpuff or the like, which consists in presenting the flesh side of a lambskin having hair thereon to a cutter, supporting the hair side on a yielding support, effecting a relative rotation of the cutter and lambskin about an axis perpendicular to the skin, and applying the cutter to the skin in an axial direction to cut out a circular section of the skin.

WILLIAM C. KNOERNSCHILD.
NORBERT W. KNOERNSCHILD.

CERTIFICATE OF CORRECTION.

Patent No. 2,034,194.  March 17, 1936.

WILLIAM C. KNOERNSCHILD, ET AL.

It is hereby certified that error appears in the printed specification of the above numbered patent requiring correction as follows: Page 2, first column, line 7, claim 4, strike out the article "an" and insert instead the words a smooth knife-like; and line 9, same claim, after "skin" and before the period insert the words to cut out a smooth-edged circular section of the skin; and that the said Letters Patent should be read with these corrections therein that the same may conform to the record of the case in the Patent Office.

Signed and sealed this 21st day of April, A. D. 1936.

Leslie Frazer
Acting Commissioner of Patents.

(Seal)

cular path concentric with said axis to cut out a smooth-edged circular section of the skin.

4. Apparatus for producing a circular pad from a hair-bearing skin, comprising a support on which the skin is placed flesh side up, and a cutter above said support rotatable on an axis perpendicular to the skin and having an annular cutting edge concentric with said axis and engageable in an axial direction with the skin.

5. Apparatus for producing a circular pad from a hair-bearing skin, comprising a support on which the skin is placed flesh side up, and a cutter above said support rotatable on an axis perpendicular to the skin and having an annular cutting edge concentric with said axis and engageable in an axial direction with the skin, said cutter being apertured for viewing the skin therethrough.

6. The method for producing a lambskin powderpuff or the like, which consists in presenting the flesh side of a lambskin having hair thereon to a cutter, supporting the hair side on a yielding support, effecting a relative rotation of the cutter and lambskin about an axis perpendicular to the skin, and applying the cutter to the skin in an axial direction to cut out a circular section of the skin.

WILLIAM C. KNOERNSCHILD.
NORBERT W. KNOERNSCHILD.

CERTIFICATE OF CORRECTION.

Patent No. 2,034,194.　　　　　　　　　　　　　　　　　　March 17, 1936.

WILLIAM C. KNOERNSCHILD, ET AL.

It is hereby certified that error appears in the printed specification of the above numbered patent requiring correction as follows: Page 2, first column, line 7, claim 4, strike out the article "an" and insert instead the words a smooth knife-like; and line 9, same claim, after "skin" and before the period insert the words to cut out a smooth-edged circular section of the skin; and that the said Letters Patent should be read with these corrections therein that the same may conform to the record of the case in the Patent Office.

Signed and sealed this 21st day of April, A. D. 1936.

Leslie Frazer
Acting Commissioner of Patents.

(Seal)